Patented Mar. 23, 1926.

1,577,729

UNITED STATES PATENT OFFICE.

JULIUS KOEBIG, OF HOLLYWOOD, CALIFORNIA.

PROCESS FOR THE PRODUCTION OF LASTING COLORED STAINS IN AND UPON THE SURFACE OF CEMENT OR OTHER BUILDING MATERIAL.

No Drawing.     Application filed November 1, 1924.   Serial No. 747,398.

*To all whom it may concern:*

Be it known that I, JULIUS KOEBIG, a citizen of the United States, residing at Hollywood, in the county of Los Angeles, State of California, have invented a new and useful Process for the Production of Lasting Colored Stains in and upon the Surface of Cement or Other Building Material, of which the following is a specification.

This invention relates to a process of producing colored stains upon the surface of cement or other building materials.

Certain acid solutions formed in nature by the decomposition of iron and copper pyrites operate, upon flowing over natural limestones, calcareous sandstones, shales, etc., to stain or color the latter various shades of brown, yellow, red, green and blue. Substantially identical processes have been practiced for years for staining or coloring artificial stones, cement or other buiding materials, in which such materials are impregnated with solutions of ferrous, ferric, or cupric sulfates or chlorides or other metallic salts, which causes colored metallic oxides or hydroxides to be deposited in the pores of cement or other building material, there producing a lasting strain upon its surface.

This artificial reproduction of natural processes is limited to the production of only certain stains and is not able to produce many desired beautiful coloring effects. I have invented and developed a process by which, in addition to the stains and colors produced by these metallic oxides and hydroxides, many additional beautiful coloring effects upon cement and other building materials may be produced, and have developed a process by which various ingredients required for the formation of various desired pigments or dyes can be applied to the surface of cement and other building materials to produce lasting colored stains.

An object of the present invention is to provide a method of producing lasting colored stains in and upon the surface of cement or other building materials which will be adapted to the formation of a great variety of different coloring effects and produce many beautiful coloring effects which can not be formed by the use of metallic oxides or hydroxide stains alone.

Various other objects and advantages of this invention will appear from a description of the following examples of different methods embodying the invention.

In accordance with this invention, it is frequently desirable to subject the cement or other building material which is to be stained to a treatment which will render the surface of the cement or building material porous and thus better adapted to receive the staining material. Thus, the surface of the cement or other material may be subjected to a treatment with acid, such as hydrochloric acid or other mineral or organic acid, and this treatment will, by dissolving part of the ingredients of the cement or building material, open the pores on the surface. When certain materials are employed in the staining process, the acid acts to promote the staining operations, whereas with certain other materials the acid would prevent certain of the desired chemical reactions required in the formation of the stain. In such latter cases, the treatment with acid may either be eliminated or the acid washed from the cement before application of the staining material. Moreover, in place of first treating the cement or building material with an agent for opening the pores, this agent may be incorporated in the staining solution.

As one example of how various colored stains may be formed upon cement and other building materials, use may be made of the reaction between solutions of cupric sulfate and sodium chromate. Solutions of cupric sulfate form brilliant precipitates of yellowish green, green, or Bordeaux color if combined with sodium chromate to form either the basic, neutral or acid cupric chromate.

In order to apply or impregnate the cement or other building material with these precipitates, I combine a solution of sodium chromate with a solution of cupric sulfate in the required proportion to produce anyone of the above shades or colors desired and dissolve the resulting precipitate in a solvent, so that it may be applied. The solvent employed is one which upon application will be removed or modified so that the precipitate of basic, neutral or acid cupric chromate is adfixed to the cement or other building material. An example of a suitable solvent is ammonia. When an ammonia solution of such precipitate is applied to cement or other suitable building material, it penetrates the same to a certain degree and then the solvent ammonia gradually evaporates and deposits in and upon the surface of the building material a brilliant stain of one of the above named cupric chromates.

In place of using ammonia as a solvent, hydrochloric acid may be employed, which will produce slightly different shades.

When the precipitate of one of the above mentioned cupric chromates is dissolved in hydrochloric acid and applied to cement or other building material, the hydrochloric acid is gradually neutralized by the ingredients of the building material and thereby leaves the coloring pigment impregnated in the cement or other building material.

In place of adding the pigment in a solution to the cement or other building material, a brilliant color stain may be produced thereon by first impregnating the building material with one of the necessary solutions for forming a color precipitate and then applying a separate solution which produces a coloring precipitate upon contact with the first of the solutions. For example, in order to produce a brilliant blue stain upon calcareous sandstones, I first impregnate the surface with a solution of ferric chloride. I then apply a stiochiometrically equivalent quantity of a sodium ferrocyanide solution properly acidified to produce a precipitate of blue ferric ferrocyanide.

As a third example of a method of forming beautiful color effects, such color effects may be produced upon the surface of cement or other building material by applying thereto a solution of a natural or artificial organic coloring material which will form an insoluble lake with ingredients of the building material or with ingredients easily impregnated thereinto.

For example, I apply a solution of alizarin to the surface of the cement or concrete. The alizarin will then form a deep purple lake with the calcium oxide of the cement or concrete and thus be firmly adfixed thereto. The cement, concrete or other material may also be impregnated with a solution of aluminum sulfate so that there is produced a precipitate of aluminum hydroxide in the cement. Then, upon applying a solution of alizarin thereto there will be formed a brilliant red lake with the aluminum hydroxide.

To those skilled in the art, it will be apparent that my invention may be modified in various manners to produce permanent stains upon cement or building materials. My invention is therefore not limited to the particular methods or examples herein described for the purposes of illustration, but includes all such various modifications as come within the scope of the appended claim.

I claim:—

A process of producing lasting stain in and upon the surface of building materials, which comprises forming a solution of two substances which are adapted to form a water insoluble coloring matter in a solvent, which prevents such water insoluble coloring material from being formed, and impregnating a building material with such solution, the solvent being one adapted upon its application to the building material to act to permit the formation of the coloring material within said building material.

Signed at Los Angeles, Calif., this 22d day of Oct., 1924.

JULIUS KOEBIG.